United States Patent Office 3,488,501
Patented Jan. 6, 1970

3,488,501
RAPID PHOTODETECTOR CELL WITH HIGH SENSITIVITY
Pierre Poubeau, Gif-sur-Yvette, France, assignor to Nord-Aviation Societe Nationale de Constructions Aeronautiques, Paris, France, a joint-stock company of France
Filed Nov. 20, 1967, Ser. No. 684,110
Claims priority, application France, Nov. 21, 1966,
84,380
Int. Cl. G01t *1/18;* H01j *39/28*
U.S. Cl. 250—83.6                 6 Claims

ABSTRACT OF THE DISCLOSURE

A rapid photodetector cell with high sensitivity specifically directed to the spacial field comprising a parallelepiped chamber, the outer wall of which constitutes the photocathode of alkali metal, including a filiform anode and a filiform grid each divided into alternate parallel elements and filled with an atmosphere of a rare gas at high purity. Time constant 20 $\mu$-sec., efficiency 1 to 20%, operating voltage 300–500 v., pressure 3–20 cm. Hg.

---

The present invention relates to a rapid photodetector cell with high sensitivity and is directed to a particular appplication of this cell to the spatial field.

The detection of light fluxes such as those received by sighting devices with short response time, on artificial satellites for examples, necessitate photoelectric cells which have high qualities of rapidity, sensitivity and reliability, combined with conditions of weight, overall size and electrical consumption which are absolutely minimal.

For the purpose of producing cells which have such characteristics, various attempts have been made, directed to the substitution of a photocathode for the cathode of a self-interrupting detector of $\alpha,\beta,\gamma$ particles, neutrons, X-rays, cosmic rays, etc., but as far as the applicant is aware, none of these attempts have been continued.

These failures appear to be due to the fact that, on the one hand the modulation time of the ionic sheath surrounding the anode, which time is conditioned by the period of dead time and the restitution period of the detector, had not made it possible to contemplate cells of great rapidity, and that on the other hand, the geometric shape of the cathode (in most cases cylindrical) was not functionally suitable for picking-up the maximum amount of light flux, thereby restricting the actual sensitivity of the said cells.

Furthermore, it was known that gaseous mixtures of the halogen or alcohol type with which the self-interrupting detector was generally filled limited the fidelity and the duration of life of the said detectors in consequence of their molecular dissociation.

The present invention therefore proposes a photodetector cell developed by adaptation of a particle detector, the said adaptation including essentially in combination: a particular arrangement of a monofilar or multifilar anode; a particular arrangement of a monofilar or multifilar grid forming an ion trap; a particular arrangement of the chamber forming the gas chamber; and a particular characteristic of the gas with which this chamber is filled, these combinations resulting in the production of a sensitive cell of great rapidity, high reliability and minimum weight, bulk and electrical consumption.

It is generally known that a self-interrupting detector of the Geiger-Müller type, like all ionization chambers, is based on the effect produced by the passage of an ionizing particle through a chamber filled with an appropriate gaseous mixture, the said chamber being constituted by a cathode forming a wall and by a central anode, generally filiform, forming the collector.

If an increasing voltage is applied between the anode and cathode, a separation of negative ions and positive ions takes place when the voltage reaches a certain value, the immediate re-combination of the separated ions being prevented.

If the voltage is still further increased, certain free electrons which are present in the chamber become accelerated in such manner that they become ionizing and thereby increase the ionic density around the anode.

By still further increasing the voltage, the ionic multiplication becomes increasingly greater until it produces an avalanche which is furthermore localized solely in the anode region at which the electric field is at its highest value. At the same time, the ions excite the gaseous molecules and attract the electrons on the outer orbits and the spontaneous dissociation of these molecules is accompanied by an emission of U.V. photons which are propagated by producing fresh ionizations by a photoelectric effect, and in consequence fresh avalanches are produced, the phenomenon being thus propagated along the whole length of the anode.

As it is essential to stop these avalanche effects, the self-interruption of the detector is produced, on the one hand by means of an external load resistance which, as soon as the electronic current appears, reduces the voltage between electrodes below the operating threshold value, and on the other hand by introducing into the chamber a small quantity of gas with polyatomic molecules (alcohol, etc.) or of halogen gas (chlorine, bromine, etc.).

The result is that the gas with polyatomic molecules, selected for its ionization potential which is less than that of the rare gas filling the chamber, and for its capability of photodissociation on the one hand, acquires during the movement of the ionic sheet towards the cathode all the ionization of the said rare gas, and on the other hand absorbs by dissociation all the photons emitted during the neutralization of the ions which consecutively causes the suppression of the photoelectric effect of the cathode and therefore the stopping of the discharge. Similarly, the halogen gas, by virtue of its electro-negative character, absorbs the low-energy electrons produced by influence on the cathode before these latter have been able to produce fresh ionization and therefore fresh avalanches.

It is known that unfortunately the self-interrupting detectors have a not-negligible dead time, due to the fact that at each discharge the electric field localized around the anode is temporarily weakened and is insufficient for the electrons produced by an ionizing particle to be able to ionize the gas again, and also have a relatively-long restitution time due to the fact that from the end of the dead time, that is to say as soon as the electric field again becomes sufficient, the ionizing particles begin to give rise to impulses which are first of all very small and which then increase until the electric field has resumed its initial value, the said times being in general respectively of the order of 150 $\mu$-sec. and 250 $\mu$-sec. On the other hand, the duration of life of these self-interrupting detectors is small due to the fact that, at each discharge, a considerable number of polyatomic molecules (about $10^9$) is destroyed and thereby limits the fidelity and the reliability of the said detectors.

In addition, their geometric forms are generally not adapted to pick-up the maximum amount of incident radiation, in view of the fact that, for a cylindrical section for example, the useful width is considerably less than that which would be obtained from a highly-flattened rectangular section of the same surface area.

It is naturally obvious that the fact of purely and simply substituting a photocathode for the cathode of a conventional detector for the purpose of detecting light fluxes would not result in the elimination of the above-mentioned disadvantages.

It is from this finding that the applicant has been led to design a type of photodetector cell forming the object of the present invention, and which will be described in detail in the text which follows below.

From another point of view and in order to define the position of one of the problems which the invention set out to resolve, it appears necessary to make the following developments:

If it is desired to locate rapidly, by means of an anlyzing sighting device mounted on an artificial satellite, for example, a star of magnitude 0 which gives a light of $2.1 \times 10^{-6}$ lux or lumens per square meter, it is necessary for the photoelectric cell of the said sighting device to have a sensitivity at least equal to $$\frac{2.1 \times 10^{-6}}{10,000} = 2.1 \times 10^{-10}$$ lumens per square centimetre In such a case, the power received by the surface of 1 square centimetre, taking a mechanical equivalent of the light of 1 lumen=0.0016 watt for a coefficient of maximum luminosity, will be substantially:

$2.1 \times 10^{-10} \times 0.0016 = 3.36 \times 10^{-13}$ watts, or $3.36 \times 10^{-13} \times 10^7 = 3.36 \times 10^{-6}$ erg/sec.

Furthermore, considering that the number of photons theoretically emitted by a body in one erg of light can be estimated at $9 \times 10^{11}$ photons per second (Photoelectric Cells and Their Applications, by Zworking & Wilson, page 314) it is possible to estimate the total number of photons received by a surface of 1 sq. cm. of the photocathode by putting:

$9 \times 10^{11} \times 3.36 \times 10^{-6} = 3 \times 10^6$ photons/sq.cm./sec.

which, assuming in the first place a photocathode efficiency of 3% and an optical efficiency of 50% for the sighting device, finally results in a number of electrons emitted per second and per square centimetre of illuminated photocathode given by:

$3 \times 10^6 \times 0.03 \times 0.5 = 45,000$ electrons/sq. cm./sec.

or 45 electrons/sq. cm./millisec. or approximately 1 electron for each 20 $\mu$-sec.

These obviously pessimistic data have only been given by way of example and in order to fix clearly the order of magnitude of the sensitivity and rapidity which the photodetector cells according to the invention should possess.

There will now be described by way of non-limitative example one preferred form of embodiment of a rapid photodetector cell with high sensitivity intended to equip a star analyzer sighting device arranged on an artificial satellite in accordance with the present invention, reference being made to the accompanying drawings, in which.

Figure 1:
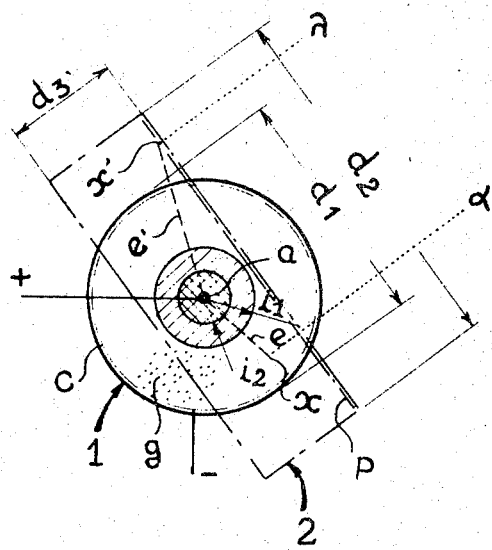
FIG. 1 shows diagrammatically the sections formed respectively in a conventional detector of cylindrical geometry and in a detector of rectangular geometry.

In FIG. 1, which shows the arrangement of a conventional self-interrupting detector 1 of standard geometry cylindrical for example, in which $a$ represents the anode, $c$ the cathode and $g$ the gaseous mixture, there can be brought out the fact that any particular $\alpha$ particle for example, passing through the detector, will produce an electron $e$ at a given point $x$, and then an avalanche of electrons which will be collected by the anode $a$ so that the ionic sheath $i_1$ before the avalanche is located at $i_2$ after the avalanche, at the exact moment when the detector has reached the end of its dead time.

Still referring to FIG. 1, a rectangular arrangement of the section of a cell 2 equipped with a photocathode $p$ shows that a photon $\gamma$ will similarly produce at $x'$ an electron $e'$, the effect of which in this cell 2 will be identical with that previously obtained by the electron $e$ in the detector 1. This leads to the establishment of the fact that, following this same figure, the geometry of 1 would be badly adapted to a photodetector cell according to 2, since for the same section equal to unity, $d_1$ would be in the first case equal to $$\sqrt{\frac{4 \times 1}{\pi}} = \sqrt{1.3} = 1.14$$

while in the second case, and for a ratio $d_3/d_2$ of 0.01 for example, $d_2$ would be 10, which would thereby lead to an increase in dimension and therefore to an increase in sensitivity of $10/1.14 \simeq 7$.

One of the characteristic features of the invention is derived from this first arrangement.

A second arrangement will initiate a further characteristic feature of the invention.

If it is first of all recalled that the mechanism of release of avalanches is partly produced, for a given limit voltage, by the excitations of the gaseous molecules obtained by attraction of the electrons on the outer orbits, the said excitations causing the emission of U.V. photons by spontaneous dissociations, the photons striking the cathode, it is easy to establish that the avalanches will be all the more numerous if the photocathode of the cell then substituted for the cathode of the detector readily permits an electron to pass out under the influence of a quantum of energy H.V. In addition, by recalling also that the phenomenon of self-interruption appears spontaneously when the avalanche produces a certain current sufficient to cause a sudden voltage drop by reason of the presence of an external resistance R, it may be considered that the self-interruption time of a photodetector cell will be shorter and the current will be correspondingly more intense as the emission of the electrons becomes greater.

This maximum emission of electrons is obtained by choosing on the one hand a photocathode-anode electric field which is just sufficient to excite the atoms of the gas contained in the chamber without however exceeding the ionization potential of this gas, and on the other hand by eliminating from the chamber all gases having an ionization potential less than that of the gas considered.

This arrangement leads to the definition of a low and constant photocathode-anode voltage due to the fact that on the one hand the distance separating these latter may be reduced by the first arrangement and that, on the other hand, the gas retained can be chosen from those having a relatively-low ionization potential while at the same time being produced with a very high degree of purity, such as argon at 99.995% purity, for example.

Figure 3:
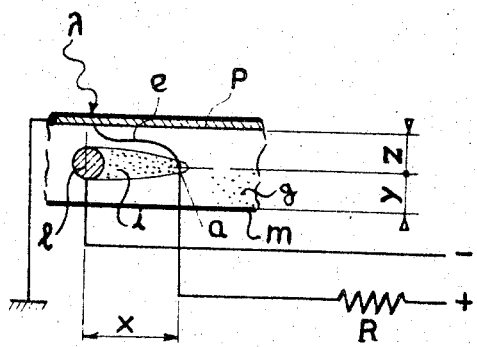
FIG. 3 is a partial diagrammatic section made of the photodetector cell and which brings out clearly a characteristic negative-grid effect proper to the invention.

According to a third arrangement from which is derived a further characteristic feature of the invention and which is shown in FIG. 3, the anode $a$ is influenced by a grid $l$ brought to a negative potential. In such a case, the sheath of ions $+i$ which generally surrounds the anode, is in these circumstances attracted by the grid, more negative than the photocathode, so that any electrons $e$ proceeding from an incident photon $\gamma$ striking the photocathode $p$ is collected by the anode and is only subjected to a minimum attraction by the ionic sheath $i$.

Figure 2:
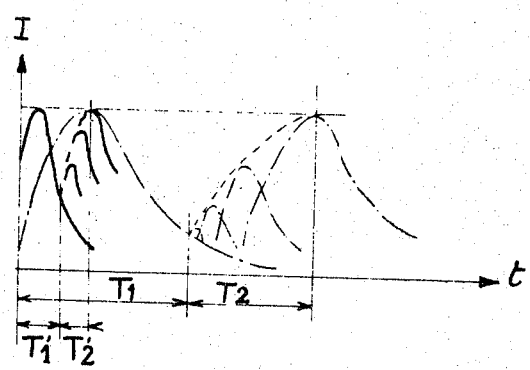
FIG. 2 shows curves in which are illustrated the dead time and restitution time of a self-interrupting detector and also of a photodetector cell in accordance with the invention.

An arrangement of this kind results in a redudction of the dead time and of the restitution time of the cell, since the thickness of the ionic layer located between the anode and the photocathode is a minimum. To this end, FIG. 2, which shows in broken lines the curves representing the dead time $T_1$ and the restitution time $T_2$ (I being the height of the impulse and $t$ the time) clearly shows in full lines the shape of these same curves $T_1'$ and $T_2'$ in the case of a photodetector cell with a grid in accordance with the invention.

Figure 4:
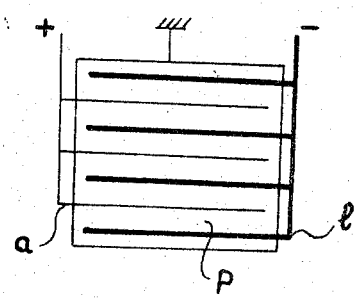
FIG. 4 shows diagrammatically the photodetector provided with an anode and a multifilar grid.
Figure 5:
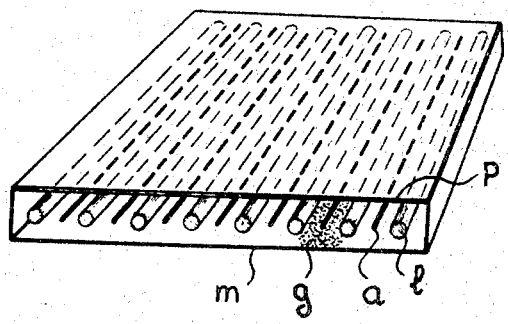
FIG. 5 shows a partial cross-section of an arrangement of the anode and multifilar grid which is derived from FIGS. 3 and 4.
Figure 6:
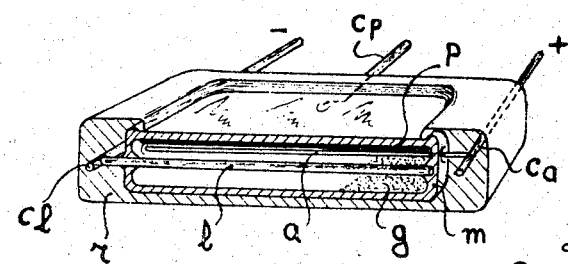
FIG. 6 shows a partial view in perspective of the possible form of construction of the photodetector cell intended for the equipment of a star-sighting device with rapid analysis.

Finally, and according to a fourth arrangement producing the last characteristic feature, brought into evidence in FIGS. 4, 5 and 6, the anode $a$ and the grid $l$ are intercalated in such manner that the photocathode $p$ is influenced by the anode field over the whole extent of its surface.

Within the scope of the star-sighting device with short response time which has previously been referred to, the photodetector cell described below by way of example may advantageously have the following overall characteristics:

distance X–Y and Z; between 0.5 and 1 mm. (preferably 0.6 mm.);
diameter of anode $a$: between 0.02 and 0.1 mm. (preferably 0.05 mm.);
diameter of grid $l$: between 0.04 and 0.2 mm. (preferably 0.1 mm.);
potential difference: between 300 v. and 500 v. (preferably 400 v.);
gas pressure: between 3 and 20 cm. Hg (preferably 20 cm.);
nature of gas: very pure rare gas, preferably argon at 99.995%;
chamber: all strong and chemically inert materials, and preferably silica;
photocathode: caesium or other metals deposited under vacuum, or a combination of three alkali metals of the known "trialkali" type and having a dark current comprised between $10^{-15}$ and $10^{-18}$ a./sq. cm., with cooling by liquid nitrogen or not, depending on the type of layer;
amplification: for 1 electron on the anode, an impulse of 0.5 to 1 volt over a resistance R of 1MΩ;
efficiency:

$$\frac{\text{electrons emitted}}{\text{photons received}} = 1 \text{ to } 20\%$$

according to the photocathode;
time constant: from 5 to 20 μ-sec. corresponding to the possible detection of 1 electron every 20 μ-sec., as provided in the case of the above-mentioned star-sighting device;
approximate dimensions: 15 x 15 x 2 mm.

In addition, the photodetector cell considered can advantageously be constructed as shown in FIG. 6. In this figure, it is seen that the chamber $m$ of silica, supports and seals the outlets of the anode $a$ and the grid $l$. Furthermore, the photocathode $p$ is deposited by metallization under vacuum underneath the polished face of the chamber. Anode collectors $ca$, grid collectors $cl$ and photocathode collectors $cp$, respectively welded to these elements pass out towards the exterior of the cell, while an inert coating product $r$, of plastic material for example, covers the whole unit.

It will of course be understood that the present cell has been briefly described only by way of pure example and without limitation and that any alternative forms which may be made thereof in its construction would remain within the scope of the present invention.

Similarly, it is quite clear that although the invention is applied in a more particularly advantageous manner to a star-sighting device for an artificial satellite, it is equally well applicable to any other installations provided with a photodetector cell according to the invention.

I claim:

1. A rapid photodetector cell of the self-interrupting particle detector type with high sensitivity, applicable to sighting devices on artificial satellites and comprising:
    a parallelepiped chamber of inert material,
    a photocathode deposited on a larger external wall of said parallelepiped shaped chamber,
    a filiform anode having a plurality of parallel branches arranged in said chamber,
    a grid having a plurality of parallel branches arranged in said chamber parallel to said branches of said anode,
    said chamber being filled with a gas having a relatively low ionization potential.

2. A photodetector cell as claimed in claim 1, further characterized by
    said plurality of parallel branches of said anode and said plurality of parallel branches of said grid lying substantially in the same plane.

3. A photodetector cell as claimed in claim 1, in which the gas in said chamber is argon of high purity and does not comprise any other gas having a lower ionization potential.

4. A rapid photodetector cell of the self-interrupting particle detector type of high sensitivity, applicable to sighting devices on artificial satellites and comprising:
    a parallelepiped chamber of which the outer wall of maximum surface constitutes the photocathode, and arranged in said chamber, at least one filiform anode parallel to at least one grid,
    said chamber being filled with a gas of high purity having a relatively-low ionization potential, selected from the group consisting of the rare gases and in which the photocathode is electrically connected to the earth system of a generator, the anode is brought up to a positive potential and the grid to a negative potential with respect to the anode.

5. A rapid photodetector cell of the self-interrupting particle detector type with high sensitivity, applicable to sighting devices on artificial satellites and comprising:
    a parallelepiped chamber having a height of 0.5 to 1 mm., of inert material such as silica, a photocathode of a metal chosen from the group consisting of the alkali metals and the combinations of three alkali metals, on the largest external surface of said chamber and having a dark current comprised between $10^{-15}$ and $10^{-18}$ a./sq. cm., at least one filiform anode placed parallel to at least one grid at a distance of 0.5 to 1 mm., the diameter of the anode being from 0.02 to 0.1 mm., the diameter of the grid from 0.04 to 0.2 mm. containing an atmosphere of a rare gas of high purity at a pressure of 3 to 20 cm. of mercury, and in which the photocathode is connected electrically to the earth system of a generator, the anode is brought to a positive potential comprised between 300 and 500 volts and the grid to a negative potential with respect to the anode.

6. A photodetector cell as claimed in claim 5, and comprising an anode and a cathode, each being divided into alternate parallel elements.

References Cited

UNITED STATES PATENTS

| | | | |
|---|---|---|---|
| 2,599,352 | 6/1952 | Schneider | 313—93 |
| 3,090,866 | 5/1963 | Brannon | 313—93 X |
| 3,327,152 | 6/1967 | Greilich | 313—99 |

RALPH G. NILSON, Primary Examiner

D. L. WILLIS, Assistant Examiner

U.S. Cl. X.R.

313—93